Sept. 20, 1955     B. G. BIRDWELL     2,718,430
TRAILER DUMP UNIT
Filed June 11, 1954     2 Sheets-Sheet 1
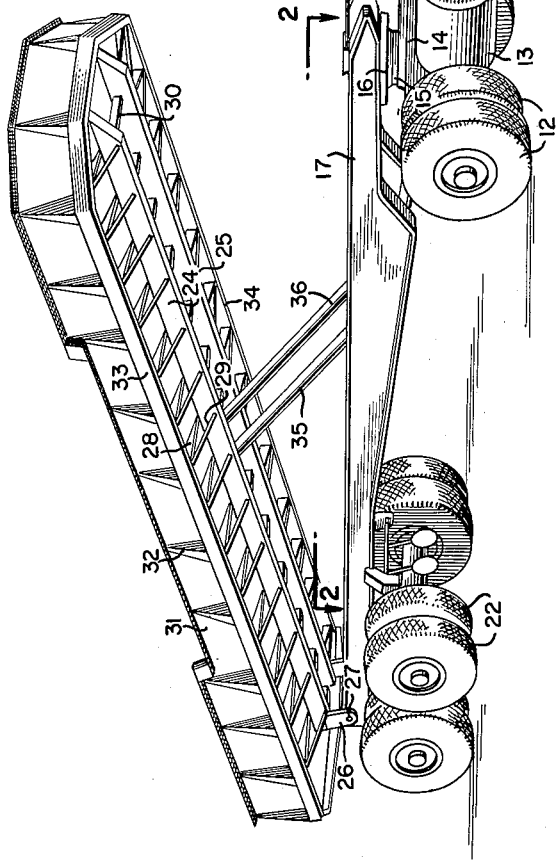
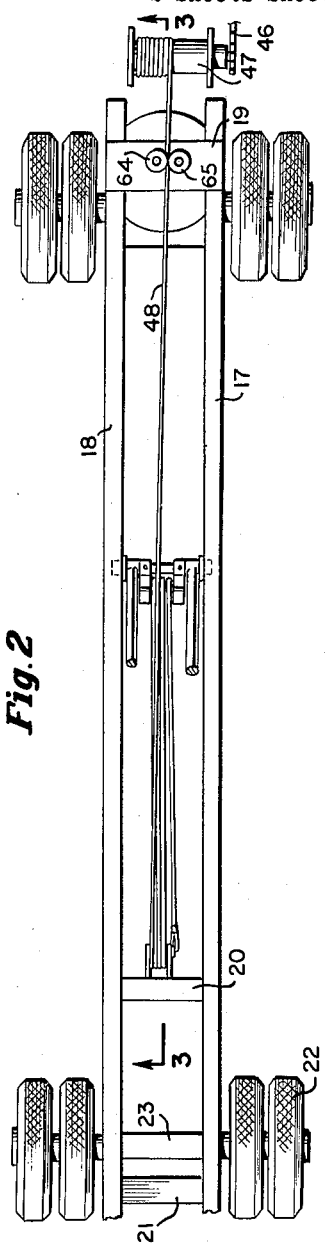
Inventor
Billy G. Birdwell
By
*A. Yates Dowell.*
Attorney Sept. 20, 1955   B. G. BIRDWELL   2,718,430
TRAILER DUMP UNIT
Filed June 11, 1954   2 Sheets-Sheet 2
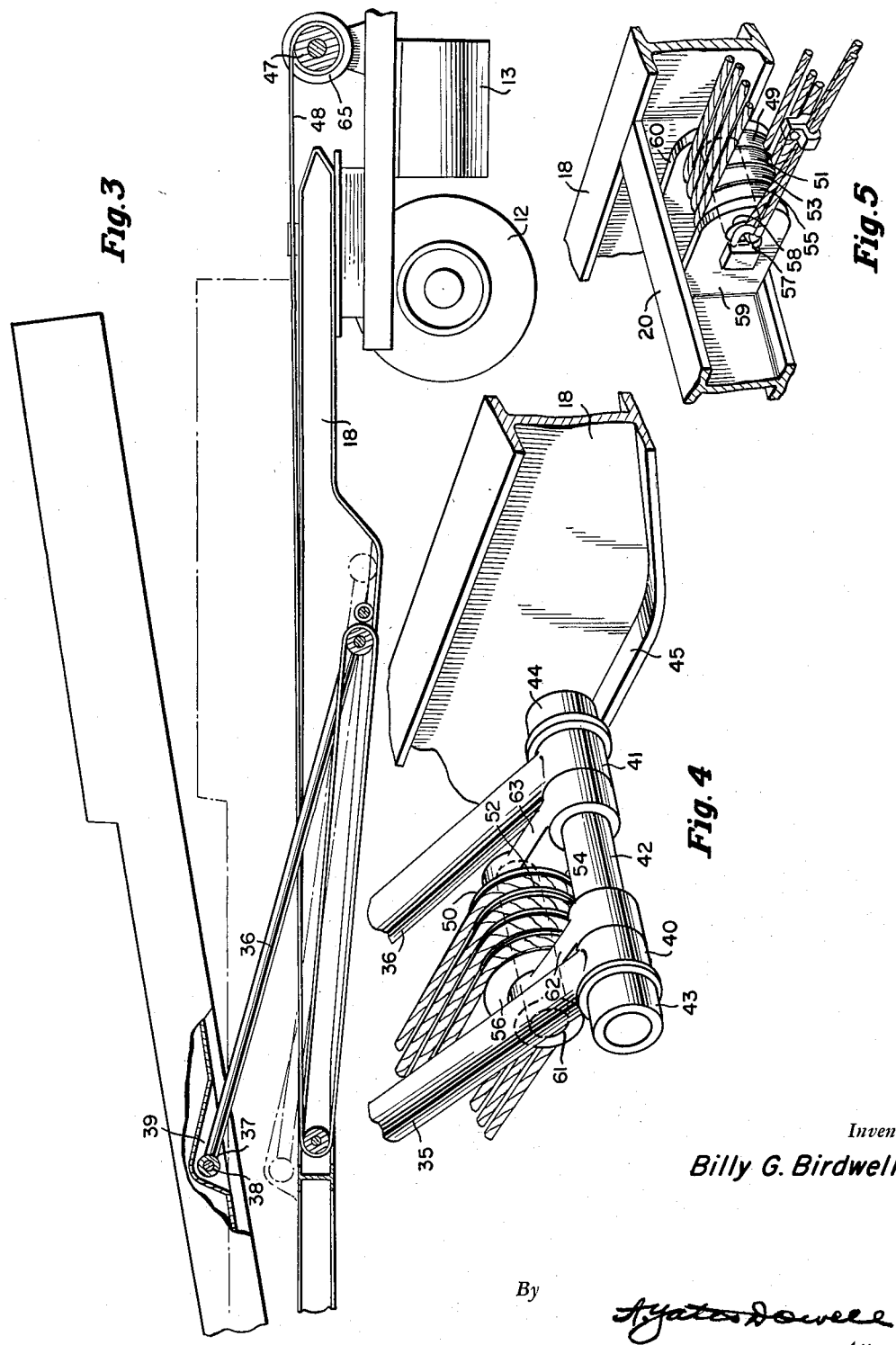
Inventor
Billy G. Birdwell
By  *A. Yates Dowell.*
Attorney United States Patent Office 2,718,430
Patented Sept. 20, 1955

2,718,430

TRAILER DUMP UNIT

Billy G. Birdwell, Fort Stockton, Tex.

Application June 11, 1954, Serial No. 436,041

7 Claims. (Cl. 298—21)

This invention relates to the transportation of commodities and to vehicles and other equipment employed in hauling sand, gravel, and other loose substances in relatively large heavy loads where it is desirable to move the material rapidly in large quantities during excavating, building or other work.

The invention is particularly concerned with vehicles capable of hauling relatively large, heavy loads and capable of dumping or discharging a load in a minimum of time as for example, by tilting the vehicle body.

Vehicles having bodies or beds movable to discharge the contents of the same are old and well-known, however, difficulty has been experienced in insuring the discharge of all of the load without some small portion being retained, thereby reducing the efficiency of the operation. In vehicles of this kind usually the load is discharged over a relatively large area instead of over a relatively small area in a compact pile. Also prior vehicles have required extra parts or equipment, have been expensive, complicated and have included weaknesses reducing their strength and durability.

It is an object of the invention to overcome the above difficulties by providing a truck or tractor, and a trailer of simple relatively inexpensive strong, durable and efficient construction employing the conventional fifth wheel connection or coupling, and with a bed or body which can be tilted to quickly discharge the entire contents in a high pile and over a relatively small area.

Another object of the invention is to provide a trailer unit of simple, strong and durable construction, which on account of its fifth wheel construction can be quickly attached to or detached from a conventional truck or tractor and with such unit having a sub-frame supporting a body which can be removed and the sub-frame employed for hauling other materials.

A further object of the invention is to provide a trailer unit having a dump body and mechanism for moving the body for discharging completely a load, with such mechanism including a windlass mounted directly thereon or on a propelling truck or tractor, and in either case including force multiplication mechanism such as a cable with block and tackle for elevating the body to discharge the contents.

Other objects and advantages of the present invention will become apparent from the following description taken in conjunction with the drawings, wherein:

Fig. 1 is a perspective of a combination truck or tractor and trailer unit illustrating one application of the present invention and with the body raised slightly toward dumping position;

Fig. 2, a top plan view taken on the line 2—2 of Fig. 1;

Fig. 3, an enlarged fragmentary detail on the line 3—3 of Fig. 2;

Fig. 4, an enlarged fragmentary perspective of the lower end of the strut supporting structure and the group of pulleys or sheave wheels carried thereby; and Fig. 5, an enlarged fragmentary detail of a part of the intermediate portion of the sub-frame on which cooperating sheaves are mounted.

Briefly stated, the invention comprises a conventional truck or tractor and a novel trailer unit detachably connected thereto by means of a conventional pivotal connection or fifth wheel. The trailer unit has a sub-frame supported at its rear by multiple wheels and axles and on the sub-frame is tiltably or pivotally mounted by means of a transverse shaft a bed or body. The sub-frame is composed of spaced parallel frame members in the form of I-beams between which on the lower contiguous flanges are mounted cooperating rollers which support a shaft on which are pivoted a pair of struts one adjacent each frame member. The upper ends of the struts are pivoted to the intermediate portion of the bed or body.

The rear portion of the body forms one side of a triangle, the struts provide a second side, and the base or third side is formed by the sub-frame. The base is of variable length while the other two sides are not. Thus when the base is shortened the body is raised or tilted and when the base is lengthened the body is lowered.

In order to move the lower ends of the struts and the shaft on which they are mounted to shorten and lengthen the base of the triangle to raise and lower the body, power means is provided comprising a windlass which for convenience may be mounted on the truck and rotatable from the power plant of the truck for winding a cable up on it or for unwinding the same therefrom. The cable is extended around pulleys or sheave wheels anchored between cross-members of the frame towards the rear end of the latter, and cooperating pulleys or sheaves are carried by the shaft on which the lower ends of the struts are pivotally mounted. The rear end of the cable is anchored to the fixed support for the pulleys or sheave wheels towards the rear end of the truck. When the windlass is operated, the cable will be wound about the same and draw the two sets of sheave wheels toward each other and move the struts to elevate the forward end of the bed or body of the trailer to discharge the contents.

The bed or body is pivoted at its rear end at sufficient height that when the body is tilted to discharge its load it will be high enough to cause a high pile to be formed over a comparatively small area instead of scattered or spread over a much larger area.

The pivot pins between the struts and the trailer body and between the rear end of the frame and the bed or body may be taken out to permit the bed or body to be removed so that the sub-frame may be employed for hauling other materials. Likewise, the trailer unit may be readily attached to or detached from the truck or tractor in the usual manner since it is connected by the conventional fifth wheel.

With continued reference to the drawings a truck or tractor 10 of conventional construction is provided having front wheels 11 and rear wheels 12 with the latter of dual type to support a heavier load. A gas tank 13 is adapted to contain a supply of gasoline or other fuel for operating the power plant of the vehicle. The truck or tractor 10, is provided with a body 14, on which is mounted connecting plate 15 for supporting thereon a cooperating connecting plate 16 and forming a pivotal or fifth wheel connection.

The plate 16 is attached to and forms a support for the front end of a trailer unit including a pair of longitudinally disposed frame members 17 and 18 mounted in spaced parallel relation and connected by cross-members 19, 20 and 21. The frame members 17 and 18 are supported adjacent their rear end portions by sets of dual wheels 22 mounted on axles 23. A bed or body is likewise provided with the rear ends thereof and the rear ends of the frame members pivotally connected, the body having central longitudinal truss members 24 and 25 from the rear end of each of which is disposed a depending hinge member 26 and with a pivot pin 27 connecting the same to the rear ends of the frame members so that the body may be tilted by the raising and lowering of the front end of the same. The body may have pairs of supporting braces 28 and 29 spaced longitudinally of the body and connected to the truss members 24 and 25. Additional braces 30 may be employed so that the body will be a rigid, strong structure. The body likewise may have upright sides 31 and braces 32 as well as side members 33 and 34 which extend along the lower portion of the body at the sides as well as at the rear and front.

In order to elevate the forward end of the body to discharge its load a pair of struts 35 and 36 are provided, such struts having upper sleeved ends 37 in which is received a stub shaft or pivot pin 38. The ends of the stub shaft 38 are removably mounted in a pair of spaced parallel plates 39 which are disposed vertically within a depression on the underside of the bottom of the bed or body so that the ends of the struts 35 and 36 are pivoted to the body above the plane of the bottom of the same to increase the angularity of the struts and locate their upper ends as far as possible above the frame members and to decrease the angle between the rear portion of the bed or body and the struts and consequently reduce the amount of force necessary to move the lower end of the struts longitudinally of the frame members to shorten and lengthen the base or lower side of the triangle thus formed. The lower ends of the struts 35 and 36 are provided with sleeve ends 40 and 41 in which a stub shaft 42 is received, such shaft having rollers 43 and 44 on its outer ends which roll upon the lower inner flanges of the I-beams as shown particularly in Fig. 4, wherein the flange 45 of the I-beam 18 forms a track for the roller 44, the I-beam 17 having a corresponding flange extending towards I-beam 18 and forming a support for the roller 43. The frame members 17 and 18 are I-beams, the flanges of which perform the dual function of reinforcing and with their contiguous lower portions providing supporting tracks as will be hereinafter more fully described.

When the shaft 42 and the lower ends of the struts 35 and 36 are moved rearwardly of the vehicle to shorten the base of the triangle the bed or body will have its front end raised, and when the lower ends of the struts are moved in an opposite direction the front end of the bed or body will be lowered.

In order to supply the necessary power for operating the shaft 42 two sets of pulleys or sheave wheels may be employed, one anchored to the member 20 adjacent the rear portion of the frame and the other attached to the stub shaft 42 and with one end of the cable anchored adjacent the rear group of pulleys or sheave wheels while the other end of the cable is attached to the windlass on the forward portion of the vehicle.

Power may be supplied from the power plant of the vehicle through a driving connection such as a chain 46 to the windlass 47 to which is secured one end of an operating cable 48 which extends rearwardly of the frame members downwardly around a pulley or sheave wheel 49, then forwardly and upwardly around a pulley or sheave wheel 50, then rearwardly and downwardly around a pulley or sheave wheel 51, then forwardly and upwardly around a pulley or sheave wheel 52, then rearwardly and downwardly around a pulley or sheave wheel 53, then forwardly and upwardly around a pulley or sheave wheel 54, then rearwardly and downwardly around a pulley or sheave wheel 55, then forwardly and upwardly around a pulley or sheave wheel 56, then rearwardly where it is secured to an anchoring loop 57. The pulleys or sheave wheels towards the rear end of the vehicle are mounted on a stub shaft 58 carried by supports 59 and 60, and the other or forward group of pulleys or sheave wheels are mounted on a stub shaft carried in the forward ends of arms 62 and 63 pivoted on the shaft 42. Grooved guide pulleys 64 and 65 are provided on cross member 19 for engaging and guiding cable 48 so that the cable passes substantially over the center of the fifth wheel at all times permitting the dump vehicle to be operated in all positions of the tractor.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A tractor trailer unit including a tractor truck with a conventional fifth wheel coupling member and a trailer with a cooperating conventional fifth wheel coupling member, said trailer comprising a frame having spaced substantially parallel members extending substantially the full length thereof and having inwardly extending inclined track forming portions along the lower facing edges thereof, a dump body on said frame pivotally connected adjacent its rear end thereto, a pair of struts pivotally connected to said dump body intermediate the ends thereof with such pivotal connection located above the bottom of the body and between the sides thereof, rollers carried on the other ends of said strut members and rollable on said track forming portions toward and from the pivotal connection between the rear end of the body and said frame to raise and lower said body, said track forming portions being below the main portion of the frame so that when the movable ends of the struts are located thereon they will be in a substantially lower horizontal position than the upper ends of the struts and provide the necessary lifting component, and power means for moving the lower ends of said struts for raising and lowering said body, said power means including spaced groups of pulleys connected to said chassis and to the movable ends of the struts and a cable wound around the same, and means located on said tractor trailer unit for applying pulling force to said cable.

2. A truck tractor trailer dump unit including a truck tractor having a conventional fifth wheel coupling unit and a winch, a trailer having a conventional cooperating fifth wheel coupling unit, said trailer comprising a chassis frame having spaced substantially parallel members forming inwardly extended channels, said members being supported on conventional wheels near their rear ends and attached to said cooperating fifth wheel coupling unit at their forward ends, trackways enclosed within the channels formed by said spaced parallel members, a portion of said trackways being inclined, a dump body on said frame pivotally connected adjacent its rear end to said parallel members, a spaced pair of struts pivotally connected to said dump body intermediate the ends thereof, a shaft extending between the opposite ends of said struts and having rollers thereon, said rollers being movable on said trackways to raise and lower said body, said trackways being positioned substantially below a line extending between the pivot axis between said body and said frame and the pivot axis between said body and said struts in order that said struts will provide the necessary lifting component when said rollers are located on said trackways, said cooperating fifth wheel coupling unit having a cable guide, a cable connected between said winch and a force multiplication mechanism consisting of spaced means, one connected to the chassis frame and the other to said shaft and movable therewith, said cable extending through said guide for moving the lower ends of said struts to raise said body.

3. A vehicle including a dump unit, said vehicle comprising a chassis frame having spaced substantially parallel channel members extending substantially the full length of the dump unit and supported on conventional wheels near their rear ends, the lower flanges of said members extend toward each other forming trackways, a portion of said trackways being inclined, a dump body on said frame pivotally connected adjacent its rear end to said parallel members, said dump body having spaced parallel longitudinal beams extending between ends of said body, said beams overlying said frame members when said body is in a horizontal position, a pair of struts pivotally connected to said dump body intermediate the ends thereof and between said beams, the axis of the strut pivots lying above the bottom edges of said beams, a shaft extending between the other ends of said struts and having rollers thereon, said rollers being movable on said trackways to raise and lower said body, said trackways being positioned substantially below a line extending between the pivot axis between said body and said chassis frame and the pivot axis between said body and said struts so that said struts will provide the necessary lifting component when said rollers are located on said trackways, power means including a cable connected to the lower ends of said struts and to the chassis frame, and winch means on the vehicle for applying tension to said cable.

4. The combination of a tractor trailer dump unit including a tractor having a conventional fifth wheel coupling unit and a winch, a trailer having a conventional cooperating fifth wheel coupling unit, said trailer comprising a chassis frame having spaced substantially parallel members forming channels, said members being supported on conventional wheels near their rear ends and attached to said cooperating fifth wheel coupling unit at their forward ends, trackways enclosed within the channels formed by said spaced parallel members, a dump body on said frame pivotally connected adjacent its rear end to said parallel members, a spaced pair of struts pivotally connected to said dump body intermediate the ends thereof, said struts having rollers on their lower ends, said rollers being movable on said trackways to raise and lower said body, said trackways being positioned substantially below a line extending between the pivot axis between said body and said frame and the pivot axis between said body and said struts in order that said struts will provide the necessary lifting component when said rollers are located on said trackways, said cooperating fifth wheel having a cable guide, a cable connected between said winch and a force multiplication mechanism connected to said struts and to said chassis frame and extending through said guide for moving the lower ends of said struts to raise said body.

5. A truck tractor trailer dump unit as set forth in claim 2 wherein a depression is formed in the bottom wall of said body in intermediate relation to the ends thereof and between said beams, said struts being pivotally connected to the dump body at their upper ends within said depression.

6. A truck tractor trailer dump unit including a truck tractor having a conventional fifth wheel coupling unit and a winch, a trailer having a conventional cooperating fifth wheel coupling unit, said trailer comprising a chassis frame having spaced substantially parallel channel members extending substantially the full length thereof, said members being supported on conventional wheels near their rear ends and attached to said cooperating fifth wheel coupling unit at their forward ends, said channel members having their lower flanges extending inwardly toward each other to form trackways with a portion of said trackways being inclined, a dump body on said chassis frame pivotally connected adjacent its rear end to said parallel channel members, a pair of spaced struts pivotally connected to said dump body intermediate the ends thereof, a shaft pivotally extending through the lower ends of the struts and having rollers on its outer ends, said rollers being movable on said trackways to raise and lower said dump body, said trackways being positioned below the pivots of the dump body with the chassis frame and below the pivots of the struts with the dump body so that the said struts will provide the necessary lifting component when the rollers are located on the trackways, said cooperating fifth wheel having a cable guide, a cable connected between said winch and a force multiplication mechanism connected to the chassis and to the shaft, said cable extending through said guide for moving the shaft with the lower ends of the struts to raise said dump body.

7. A trailer dump unit comprising a chassis having spaced substantially parallel channel members extending substantially the full length thereof and having their lower flanges extending inwardly toward each other to form trackways, said trailer dump unit having a cooperating fifth wheel, a dump body on said chassis pivotally connected adjacent its rear end to said parallel channel members, a pair of spaced struts pivotally connected to said dump body intermediate the ends thereof, a shaft carried at the lower ends of the struts and having rollers on its outer ends, said rollers being movable on said trackways to raise and lower said dump body, said trackways being positioned below the pivots of the dump body with the chassis frame and below the pivots of the struts with the dump body so that the said struts will provide the necessary lifting component when the rollers are located on the trackways, a cable, cable guiding means located adjacent said cooperating fifth wheel, a force multiplying mechanism connected to the chassis and to said shaft respectively for moving the shaft and the lower end of the struts to raise said dump body.

References Cited in the file of this patent

UNITED STATES PATENTS

| Number | Name | Date |
|---|---|---|
| 722,896 | Pullar | Mar. 17, 1903 |
| 2,174,956 | Allison | Oct. 3, 1939 |
| 2,482,406 | Findley | Sept. 20, 1949 |
| 2,496,350 | Lundell | Feb. 7, 1950 |
| 2,517,933 | Schonrock | Aug. 8, 1950 |
| 2,542,795 | Clement et al. | Feb. 20, 1951 |